(12) United States Patent
Yoshii et al.

(10) Patent No.: US 7,086,246 B2
(45) Date of Patent: Aug. 8, 2006

(54) COOLING APPARATUS FOR FUEL CELL UTILIZING AIR CONDITIONING SYSTEM

(75) Inventors: Keiichi Yoshii, Anjo (JP); Yukihiko Takeda, Nagoya (JP)

(73) Assignee: DENSO Corporation, Kariya (JP)

( * ) Notice: Subject to any disclaimer, the term of this patent is extended or adjusted under 35 U.S.C. 154(b) by 369 days.

(21) Appl. No.: 10/785,812

(22) Filed: Feb. 24, 2004

(65) Prior Publication Data

US 2005/0022550 A1 Feb. 3, 2005

(30) Foreign Application Priority Data

Feb. 26, 2003 (JP) .................................... 2003-049519

(51) Int. Cl.
F25B 27/00 (2006.01)

(52) U.S. Cl. ..................... 62/238.7; 62/324.1
(58) Field of Classification Search ............... 62/228.1, 62/238.7, 276, 324.1, 324.6, 434, 503
See application file for complete search history.

(56) References Cited

U.S. PATENT DOCUMENTS

| | | | | |
|---|---|---|---|---|
| 6,347,528 B1 | * | 2/2002 | Iritani et al. ............... | 62/324.6 |
| 6,516,623 B1 | * | 2/2003 | Collier ....................... | 62/238.7 |
| 6,574,977 B1 | * | 6/2003 | Ozaki et al. ................. | 62/210 |
| 6,586,124 B1 | * | 7/2003 | Kelley et al. ................ | 429/17 |
| 6,605,377 B1 | * | 8/2003 | Kimbara et al. ............. | 429/26 |
| 6,645,652 B1 | * | 11/2003 | Cownden et al. ............. | 429/19 |
| 6,675,873 B1 | * | 1/2004 | Ieda et al. ..................... | 165/43 |
| 6,708,513 B1 | * | 3/2004 | Koehler et al. ............... | 62/244 |
| 6,725,679 B1 | * | 4/2004 | Itoh et al. ..................... | 62/160 |
| 6,746,515 B1 | * | 6/2004 | Wegeng et al. ................ | 95/96 |
| 6,748,757 B1 | * | 6/2004 | Matsuo et al. ................. | 62/244 |
| 6,758,981 B1 | * | 7/2004 | Mazza et al. .................. | 210/774 |
| 6,802,875 B1 | * | 10/2004 | Kimbara et al. ............... | 48/61 |

FOREIGN PATENT DOCUMENTS

| | | | |
|---|---|---|---|
| JP | 7-94202 | | 4/1995 |
| JP | 2000-195533 | | 7/2000 |
| JP | 02001239847 A | * | 9/2001 |
| JP | 2002-81792 | | 3/2002 |
| JP | 02002081792 A | * | 3/2002 |
| JP | 02002090009 A | * | 3/2002 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

A cooling circuit of a cooling apparatus for a fuel cell comprises a compressor for compressing a gaseous refrigerant, an external heat exchanger arranged on the downstream side of the compressor and for liquefying the compressed refrigerant, a pressure-reducing means arranged on the downstream side of the external heat exchanger, and an accumulator for storing the refrigerant which cools a fuel cell stack main body. The stack main body is connected to the cooling circuit between the pressure-reducing means and the accumulator and a four-way valve is arranged between the compressor and the external heat exchanger, and between the stack main body and the accumulator in the cooling circuit, and the four-way valve introduces the refrigerant from the compressor to the external heat exchanger during the cooling operation, and introduces it to the stack main body during the warming-up operation.

13 Claims, 7 Drawing Sheets

AT WARMING-UP OPERATION

No.1 CONSTRUCTION OF REFRIGERANT PATH 1 (PARALLEL)

SINGLE FUEL CELL

No.2 CONSTRUCTION OF REFRIGERANT PATH 1 (SERIES)

SINGLE FUEL CELL

COOLING APPARATUS FOR FUEL CELL UTILIZING AIR CONDITIONING SYSTEM

BACKGROUND OF THE INVENTION

1. Field of the Invention

The present invention relates to a fuel cell. Particularly, the present invention relates to a fuel cell mounted on a vehicle or, more particularly, a cooling apparatus capable of warming up the fuel cell.

2. Description of the Related Art

In recent years, a fuel cell has attracted interest from the standpoint of its eco-friendliness, high efficiency and the like, and is under development as an energy source for vehicles. In a vehicle, when the fuel cell is used as its drive source, it is necessary to quickly warm up the fuel cell itself up to predetermined proper operating temperatures when starting a vehicle from a stopped state.

As a warming-up system of a fuel cell for a vehicle, a system for warming cooling water of the fuel cell by the use of a heater (for example, see Patent document 1) has been proposed in the prior art. This warming-up system of a fuel cell is an excellent system with high efficiency during the normal operation. However, in this case because the fuel cell is operated at temperatures of below 80° C. in order to secure the durability of membrane electrode assembly of the fuel cell, the difference in temperature from the temperature of the atmosphere, which is required to be large for dissipating heat to the atmosphere during the normal operation, cannot be so large and, at the same time, because the quantity of heat dissipated from a fuel cell is extremely large, two radiators are necessary currently, and it is undesirable that the two radiators occupy a large space in the vehicle. On the other hand, when starting the fuel cell which is quite cold after the stopped state, a considerable amount of energy is required for heating the fuel cell up to the normal operating temperature. Therefore, it is difficult to start the fuel cell in a short time, resulting in a degradation in efficiency.

There has been also proposed another warming-up system for a fuel cell (for example, see Patent document 2).

[Patent document 1]

Japanese Unexamined Patent Publication (Kokai) No. 7-94202

[Patent document 2]

Japanese Unexamined Patent Publication (Kokai) No. 2000-195533

SUMMARY OF THE INVENTION

As described above, there are various problems regarding a conventional warming-up system for a fuel cell.

The present invention has been developed with the above-mentioned problems being taken into account and the object thereof is to provide a cooling apparatus for a fuel cell applicable to a case where the temperature of the fuel cell itself falls lower in a stopped state than during the operation, in a fuel cell system, and also makes a heat radiating device in a cooling system of a fuel cell compact.

Another object of the present invention is to provide a cooling apparatus for a fuel cell capable of reducing power used for a re-start, and the size of an external heat exchanger of a heat pump, by the application of the heat pump (cooling apparatus) and a heat storage unit.

In order to achieve the above-mentioned objects, according to a first aspect of the present invention, a cooling apparatus for a fuel cell cools a stack main body of the fuel cell by cooling with evaporation of the refrigerant and, furthermore, the cooling apparatus capable also of warming up the stack main body comprises a cooling circuit. The cooling circuit comprises a compressor for compressing a gaseous refrigerant, an external heat exchanger arranged on a downstream side of the compressor and for liquefying the compressed refrigerant during a cooling operation of a fuel cell system including the fuel cell, a pressure-reducing means arranged on a downstream side of the external heat exchanger during the cooling operation, and an accumulator for storing the refrigerant which has cooled the stack main body. A refrigerant path of the stack main body is connected to the cooling circuit between the pressure-reducing means and the accumulator. In the cooling circuit, a four-way valve is arranged so as to be connected to and to be interposed in both a first refrigerant piping between the compressor and the external heat exchanger and a second refrigerant piping between the stack main body and the accumulator, in the cooling circuit, and the four-way valve then introduces the refrigerant discharged from the compressor to the external heat exchanger during the cooling operation and to the refrigerant path of the stack main body during the warming-up operation.

By configuring as described above, the radiator becoming bulky in order to provide the large cooling capacity for cooling the fuel cell is replaced with a refrigerating cycle system and, therefore, the cooling apparatus for a fuel cell can be made compact. Further, it is possible to warm up the fuel cell, cooled to a low temperature while it is left in a stopped state, and to improve the efficiency of the fuel cell itself by reducing the time required for starting and increasing the efficiency of warming-up.

In a second aspect of the present invention according to the first aspect, the cooling circuit further comprises a heat storage unit.

In a third aspect of the present invention according to the second aspect, the heat storage unit is arranged between the four-way valve and the external heat exchanger.

According to the present aspect, the position at which the heat storage unit is arranged is made more specific.

In a fourth aspect of the present invention according to any one of the first to third aspects, the temperature of the refrigerant within the external heat exchanger during the cooling operation is set to a high temperature of, for example, 150° C. or higher.

In a fifth aspect of the present invention according to any one of the first to fourth aspects, by using any one of the refrigerants, such as, propylene, chlorodifluoromethane and propane, which do not freeze at a temperature of substantially −35° C. by selecting the combination of the operational pressure and operational temperature of the refrigerant, the fuel cell system can be started at a low atmospheric temperature of, for example, −30° C., during the warming-up operation.

In a sixth aspect of the present invention according to any one of the first to fifth aspects, a refrigerant such as propylene, chlorodifluoromethane or propane, which boils at substantially 80° C. by adjusting the quantity of the refrigerant contained in the cooling circuit and the refrigerant pressure, is used during the cooling operation.

According to the present aspect, it is possible to make the membrane electrode assembly of the fuel cell work effectively.

In a seventh aspect of the present invention according to any one of the second to sixth aspects, the heat stored in the heat storage unit is supplied to a portion other than the stack main body in the fuel cell system during the warming-up operation.

In an eighth aspect of the present invention according to the seventh aspect, the portion other than the stack main body includes, for example; gas cylinder main bodies, valves and pipes for high pressure hydrogen; gas cylinder main bodies, valves and pipes for liquid hydrogen; a tank main body, valves and pipes for hydrogen occlusion; a main body, valves and pipes for a fuel reformer, and so on.

According to the present aspect, the portion other than the stack main body in the seventh aspect is made more specific.

In a ninth aspect of the present invention according to any one of the first to eighth aspects, the cooling apparatus for a fuel cell is also used for an air conditioner, and a dual system in which the cooling apparatus is used for both apparatuses is formed.

In a tenth aspect of the present invention according to any one of the first to ninth aspects, the fuel cell comprising the present cooling apparatus is used in a vehicle.

According to the present aspect, the purposes of the present invention are made more specific.

In an eleventh aspect of the present invention according to any one of the first to tenth aspects, the cooling circuit further comprises a superheater, that is, a heat exchanger. The superheater is arranged next to the compressor and comprises a first heat exchange unit and a second heat exchange unit. To the first heat exchange unit, the refrigerant on a suction side of the compressor, flowing from the accumulator to the compressor, is supplied and to the second heat exchange unit, at least part of the refrigerant, on a discharge side of the compressor, flowing from the compressor to the four-way vale, is supplied, and heat of the refrigerant is exchanged between the first heat exchange unit and the second heat exchange unit and the refrigerant on the suction side of the compressor is heated.

In a twelfth aspect of the present invention according to any one of the first to tenth aspects, the cooling circuit further comprises a superheater, that is, a heat exchanger, and a four-way valve for pressure-reducing means arranged next to the pressure-reducing means. The superheater is arranged in the cooling circuit between the compressor and the accumulator and comprises a first heat exchange unit and a second heat exchange unit. Two refrigerant pipes of the cooling circuit connected to a front port and a rear port of the pressure-reducing means are connected to the four-way valve for pressure-reducing means, respectively and, further a refrigerant pipe from the refrigerant path of the fuel cell and a refrigerant pipe from the external heat exchanger are connected thereto, respectively. To the first heat exchange unit, the refrigerant on a suction side of the compressor, flowing from the accumulator to the compressor, is supplied and to the second heat exchange unit, at least part of the refrigerant, from a discharge side of the compressor, flowing from the four-way valve for pressure-reducing means to the pressure-reducing means, is supplied and heat of the refrigerant is exchanged between the first heat exchange unit and the second heat exchange unit and thus the refrigerant on the suction side of the compressor is heated.

In a thirteenth aspect of the present invention according to the first embodiment, the cooling apparatus directly cools the stack main body by cooling with evaporation of the refrigerant.

The present invention may be more fully understood from the description of the preferred embodiments of the invention set forth below, together with the accompanying drawings.

DESCRIPTION OF THE PREFERRED EMBODIMENT

The apparatuses in the embodiments of the present invention are explained in detail, below, by referring to drawings.

Figure 1:
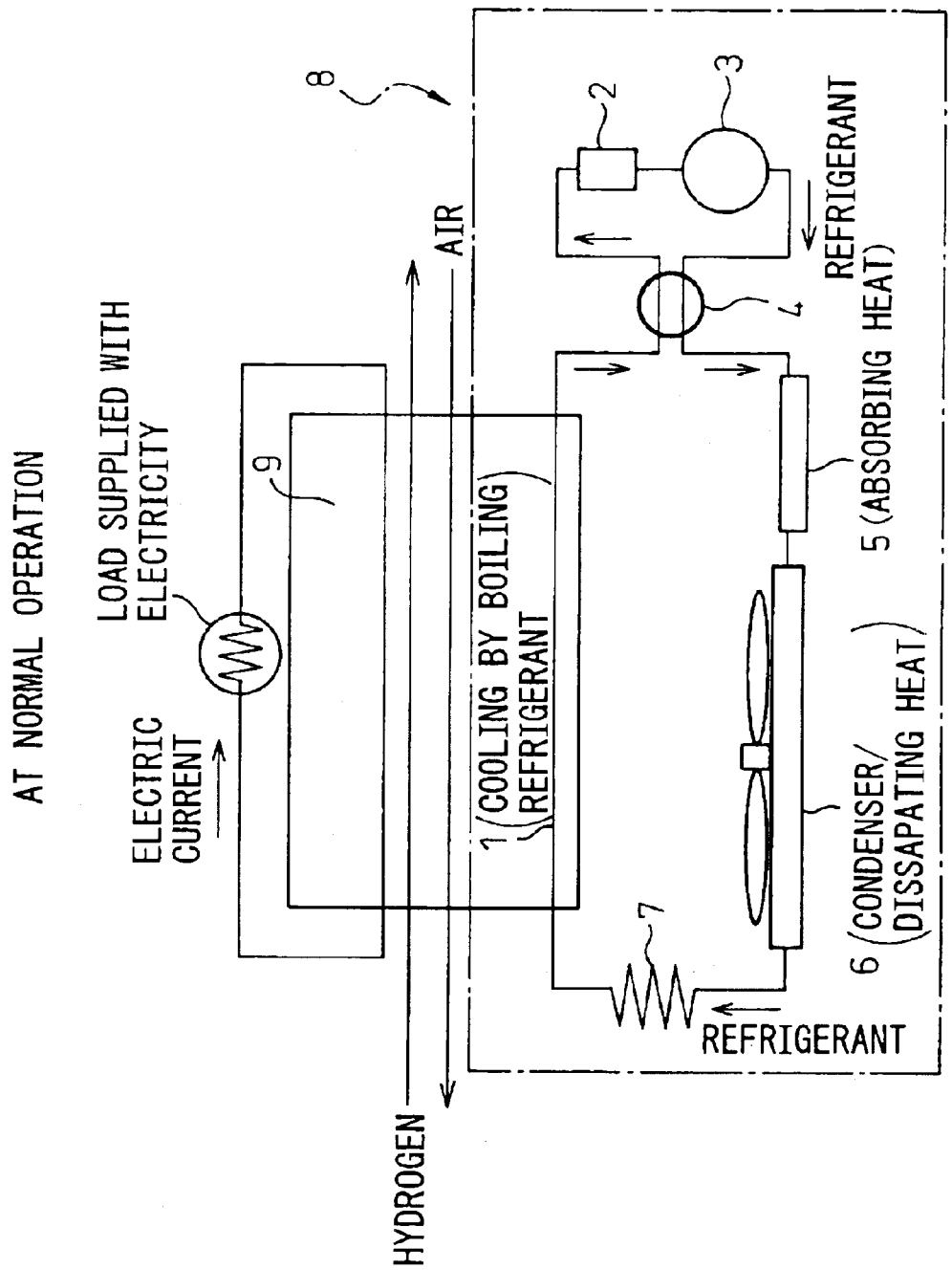
FIG. 1 shows a general configuration of a first embodiment of a cooling apparatus for a fuel cell according to the present invention and also shows the outline during the normal operation (during the cooling operation) thereof schematically.
Figure 2:
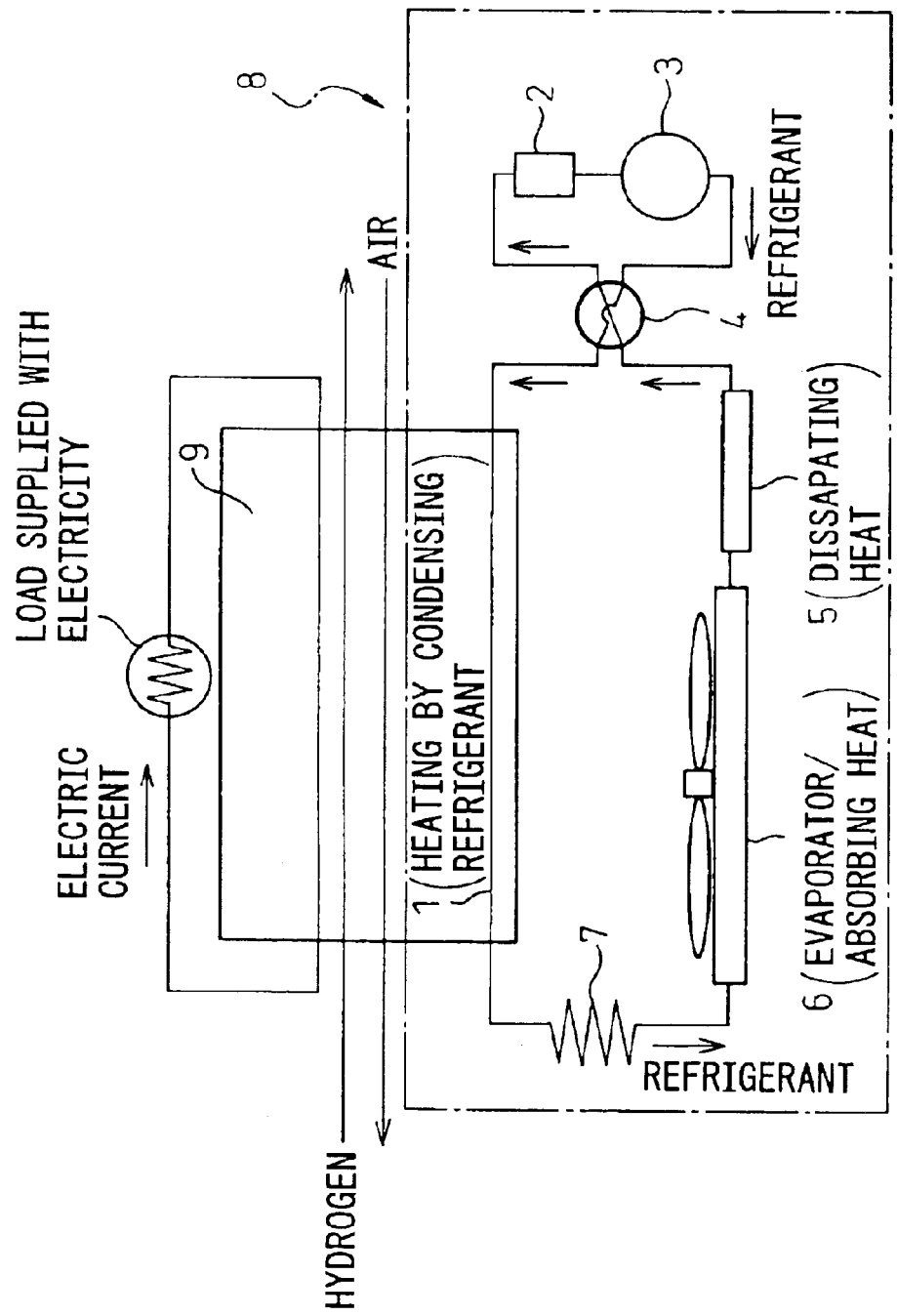
FIG. 2 shows the general configuration of the first embodiment of the cooling apparatus for a fuel cell according to the present invention and also shows the outline during the warming-up operation thereof schematically.

FIG. 1 and FIG. 2 schematically show a first embodiment of a cooling apparatus for a fuel cell according to the present invention: FIG. 1 shows a general configuration of the cooling apparatus of the present invention and an outline during a normal operation of the fuel cell (during a cooling operation); and FIG. 2 shows an outline of the cooling apparatus of the present invention during a warming-up operation of the fuel cell.

In FIG. 1, a cooling apparatus 8 in the present embodiment is connected to a stack main body 9 of a fuel cell for a vehicle, and the operation state during the cooling operation, that is, during the normal operation, is shown schematically. The cooling apparatus 8 comprises a cooling circuit and the cooling circuit in the present embodiment has a compressor 3 for compressing gaseous refrigerant, a heat storage unit 5 for storing heat by absorbing the heat of the refrigerant during the normal operation, an external heat exchanger 6 functioning as a condenser during the normal operation, a pressure-reducing means 7 contributing to vaporization of the refrigerant by expanding it, and an accumulator 2 for storing vaporized refrigerant and separating it from liquid refrigerant, as shown in FIG. 1.

A four-way valve 4 is further comprised between the discharge side of the compressor 3 and the heat storage unit 5. A refrigerant path 1 of the stack main body 9 is connected to the cooling circuit between the pressure-reducing means 7 and the four-way valve 4. As a result, to the four-way valve 4, a refrigerant pipe from the compressor 3, a refrigerant pipe from the heat storage unit 5, a refrigerant pipe from the stack main body 9 and a refrigerant pipe from the accumulator 2 are connected. Therefore, the four-way valve functions to switch the states of the cooling circuit between the cooling operation, that is, the normal operation, and the warming-up operation, as will be explained in detail later. As for the four-way valve 4, a remotely-operated type, such as an electromagnetic type, a pneumatic type, or the like, is preferable, but various types, such as a manual type, an automatic type operated by temperature, or the like, may be used.

Although various refrigerants can be used, it is preferable to use a refrigerant, which is not frozen at a temperature, for example, as low as about −35° C. by selecting the combination of the proper operational pressure (under negative pressure or pressurized state) of the refrigerant in a stopped state and the proper kind of the refrigerant, so that a fuel cell system can be started at a low atmospheric temperature such as −30° C.

Moreover, it is preferable to use a refrigerant, which can be maintained at about 80° C., at which temperature the membrane electrode assembly is effectively active and the refrigerant evaporates, in the refrigerant path 1 of the fuel cell, by adjusting the quantity of the refrigerant contained in the cooling circuit and the pressure of the refrigerant during the normal operation (during the cooling operation).

The refrigerant that meets the above-mentioned conditions includes, for example, propylene/R1270, chlorodifluoromethane/R22 and propane/R290.

However, other refrigerants may be used.

In the case of propylene (R1270), it is preferable to use it at a pressure of 38 bar or higher and at a temperature of 90° C. or higher at an inlet of the external heat exchanger 6 after the compression of the refrigerant by the compressor 3 and further at a temperature of 80° C. or lower at an inlet of the refrigerant path 1 of the stack main body 9, during the normal operation. Furthermore, it is more preferable to use propylene at a pressure of substantially 60 bar and at a temperature of substantially 125° C. at the inlet of the external heat exchanger 6 and at a temperature of substantially 75° C., in a gas-liquid two-phase state, at the inlet of the refrigerant path 1 of the stack main body 9. During the warming-up operation, it is preferable to use it in the temperature range between 60° C. and 80° C. at the inlet of the refrigerant path 1 of the stack main body 9 after compression of the refrigerant, and at a temperature of −35° C. or lower at the inlet of the external heat exchanger 6. Furthermore, it is more preferable to use it at a pressure of substantially 17.2 bar and at a temperature of substantially 80° C. at the inlet of the refrigerant path 1 of the stack main body 9 and at a temperature of substantially −40° C., in a gas-liquid two-phase state, at the inlet of the external heat exchanger 6.

In the case of chlorodifluoromethane (R22), it is preferable to use it at a pressure of 37 bar or higher and at a temperature of 90° C. or higher at the inlet of the external heat exchanger 6 after the compression of the refrigerant by the compressor 3 and further at a temperature of 80° C. or lower at the inlet of the refrigerant path 1 of the stack main body 9, during the normal operation. Furthermore, it is more preferable to use it at a pressure of substantially 60 bar and at a temperature of 128° C. at the inlet of the external heat exchanger 6 and at a temperature of substantially 75° C., in a gas-liquid two-phase state, at the inlet of the refrigerant path 1 of the stack main body 9. During the warming-up operation, it is preferable to use it in the temperature range between 60° C. and 80° C. at the inlet of the refrigerant path 1 of the stack main body 9 after compression of the refrigerant, and at a temperature of −35° C. or lower at the inlet of the external heat exchanger 6. Furthermore, it is more preferable to use it at a pressure of substantially 9.7 bar and at a temperature of substantially 80° C. at the inlet of the refrigerant path 1 of the stack main body 9 and at a temperature of substantially −40° C., in a gas-liquid two-phase state, at the inlet of the external heat exchanger 6.

In the case of propane (R290), it is preferable to use it at a pressure of 32 bar or higher and at a temperature of 90° C. or higher at the inlet of the external heat exchanger 6 after the compression of the refrigerant by the compressor 3 and further, at a temperature of 80° C. or lower at the inlet of the refrigerant path 1 of the stack main body 9, during the normal operation. Furthermore, it is more preferable to use it at a pressure of substantially 50 bar and at a temperature of substantially 120° C. at the inlet of the external heat exchanger 6 and at a temperature of substantially 75° C., in a gas-liquid two-phase state, at the inlet of the refrigerant path 1 of the stack main body 9. During the warming-up operation, it is preferable to use it in the temperature range between 60° C. and 80° C. at the inlet of the refrigerant path 1 of the stack main body 9 after compression of the refrigerant, and at a temperature of −35° C. or lower at the inlet of the external heat exchanger 6. Furthermore, it is more preferable to use it at a pressure of substantially 19.1 bar and at a temperature of substantially 80° C. at the inlet of the refrigerant path 1 of the stack main body 9 and at a temperature of substantially −40° C., in a gas-liquid two-phase state, at the inlet of the external heat exchanger 6.

As for the pressure-reducing means 7, any device can be used as long as it is capable of expanding a refrigerant by reducing the pressure thereof and, for example, a normal pressure-reducing valve, a capillary, a throttle, or the like, can be used. As for the components of the cooling apparatus 8, such as the compressor 3, the heat storage unit 5, the external heat exchanger 6 and the accumulator 2, various types of apparatuses, which are widely known, can be used for each component and the type or the like thereof is not limited. The specification of the apparatus is determined and selected appropriately in accordance with the design conditions of a fuel cell system. The design conditions, specifications and the like of a fuel cell system itself can be modified in a variety of ways and the present invention can be applied to various fuel cell systems with various specifications.

Next, the operation in the present embodiment is explained below. FIG. 1 shows the state of operation during the normal operation (during the cooling operation) and FIG. 2 shows the state of operation during the warming-up operation.

First, during the normal operation shown in FIG. 1, the compressor 3 compresses a gaseous refrigerant. The refrigerant is compressed adiabatically and pressurized by the compressor 3 and, at the same time, the temperature of refrigerant rises until a sufficient difference in temperature (for example, about 100° C.) between the refrigerant and the atmospheric air is attained. During the normal operation, as shown in FIG. 1, the four-way valve 4 is set to a state in which the compressor 3 and the heat storage unit 5 are communicated with each other and the refrigerant path 1 of the fuel cell stack main body 9 and the accumulator 2 are communicated with each other. Therefore, the refrigerant at high pressure and temperature is introduced to the heat storage unit 5 and the heat storage unit 5 stores the heat absorbed from the refrigerant. Moreover, the refrigerant is guided to the external heat exchanger 6. At this time, it is preferable to increase the temperature of the refrigerant within the external heat exchanger 6 to a temperature of, for example, 150° C. or higher in order to increase the radiating heat quantity and, on account of this, the external heat exchanger 6 can be made compact. The refrigerant dissipates the heat thereof in the heat storage unit 5 and the external heat exchanger 6, and is cooled and liquefied.

The liquefied refrigerant passes through the pressure-reducing means 7, is reduced into a proper pressure, and is further supplied to the refrigerant path 1 of the stack main body 9, where the liquid refrigerant is heated and boiled by effecting heat exchange with the stack main body 9. As described above, the heat pump cycle carried out by the cooling apparatus 8 keeps the fuel cell itself at a temperature (for example, about 80° C.), suitable for the membrane electrode assembly to operate properly, by evaporating the refrigerant in the refrigerant path 1 of the fuel cell stack main body 9, to absorb heat from and to cool the stack main body 9. The refrigerant is further introduced into the accumulator 2 through the four-way valve 4 and is stored therein and, at the same time, the liquid refrigerant contained in the vaporized refrigerant is separated in the accumulator 2. The compressor 3 then sucks and compresses the gaseous refrigerant again. In this manner, the refrigerant circulates through the cooling circuit of the cooling apparatus (heat pump) 8. As described above, the heat pump cycle of the cooling apparatus 8 during the normal operation is a normal refrigerating cycle.

Next, the operation during the warming-up operation is described below by referring to FIG. 2. During the warming-up operation shown in FIG. 2, heat exchanging sections (i.e. the external heat exchanger 6 and the refrigerant pass 1) reversely work with respect to the normal operation in the heat pump cycle by switching the refrigerant flowing state at the four-way valve 4 from that during the normal operation. In other words, the external heat exchanger 6 operates as an evaporator for absorbing heat from the atmospheric air and the refrigerant condenses in the refrigerant path 1 of the fuel cell stack main body 9 and it operates as a condenser for supplying the fuel cell with heat.

During the warming-up operation shown in FIG. 2, the four-way valve 4 is set to a state in which the compressor 3 and the refrigerant path 1 of the fuel cell stack main body 9 are communicated with each other and, at the same time, the heat storage unit 5 and the accumulator 2 are communicated with each other. Similarly, the compressor 3 compresses the gaseous refrigerant adiabatically and the refrigerant is pressurized and, at the same time, the temperature thereof is rised up to a proper temperature. The refrigerant at high pressure and high temperature is guided to the refrigerant path 1 of the stack main body 9 and heats the stack main body 9 by effecting heat exchange with the stack main body 9. Here, at least part of the refrigerant is cooled, condensed and liquefied.

The cooled refrigerant passes through the pressure-reducing means 7, is reduced into a proper pressure and, further, is introduced into the heat storage unit 5 through the external heat exchanger 6. The heat storage unit 5 dissipates heat stored during the normal operation and heats the refrigerant, and the liquefied refrigerant is evaporated and vaporized. Even if the refrigerant is not sufficiently heated in the external heat exchanger 6, the heat storage unit 5 thus contributes to and facilitates warming-up of the refrigerant and, at the same time, reduces the amount of power consumption of secondary batteries before the fuel cell starts to generate a sufficient amount of electricity. The refrigerant further passes through the four-way valve 4, is supplied to the accumulator 2, is stored therein and, at the same time, separates the liquid refrigerant contained in the vaporized refrigerant in the accumulator 2. The compressor 3 sucks and compresses the gaseous refrigerant therefrom. Similarly, the refrigerant thus circulates through the cooling circuit of the cooling apparatus (heat pump) 8. As described above, the heat pump cycle, during the warming-up operation, of the cooling apparatus 8 is a heating cycle.

In FIG. 1 and FIG. 2, the arrows attached to pipe lines of the cooling circuit indicate the flowing directions of the refrigerant.

The cooling circuit in FIG. 2 may comprise a bypass circuit and requisite piping accessories, such as a valve, for the bypass circuit so that the refrigerant flows while bypassing the pressure-reducing means 7 and the external heat exchanger 6. Or, when a pressure-reducing valve or the like is used as the pressure-reducing means 7, the cooling circuit lines around the pressure-reducing means, may be switched so that the refrigerant flows through the pressure-reducing means 7 in the same direction as that in FIG. 1 by providing valves or the like to the cooling circuit lines. Of course, the pressure-reducing means 7 may be a type capable of reversible flow.

Figure 3:
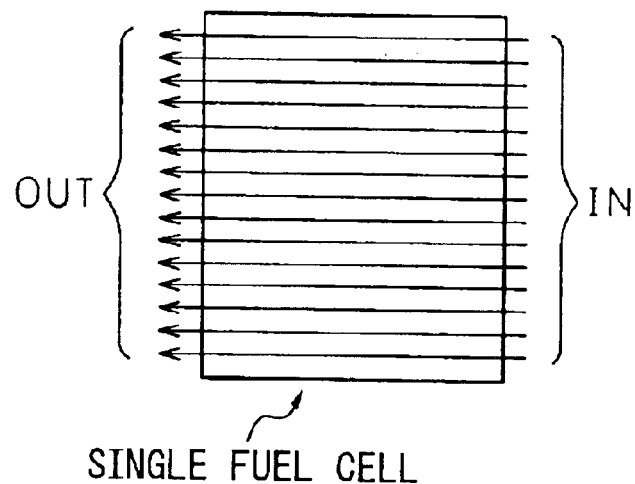
FIG. 3 shows a preferable example of a configuration of a refrigerant path 1 in a fuel cell stack main body 9.
Figure 4:
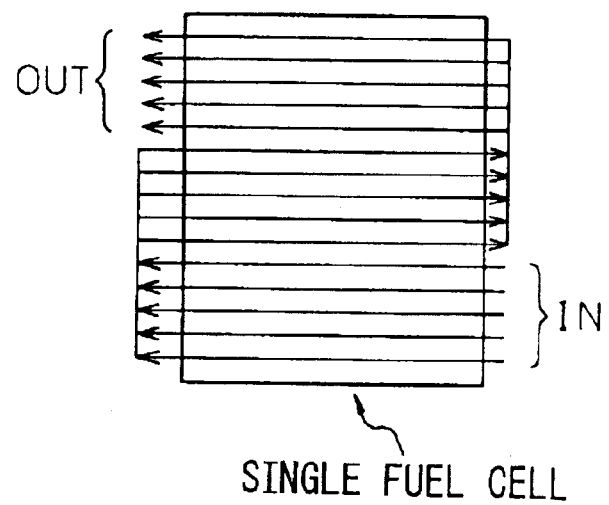
FIG. 4 shows another preferable example of a configuration of the refrigerant path 1 in the fuel cell stack main body 9.

Here, although the refrigerant path 1 of the fuel cell stack main body 9 may have various configurations, preferable examples are shown in FIG. 3 and FIG. 4. In FIG. 3, in a single fuel cell of the stack main body 9, the plurality of refrigerant paths 1 are all arranged in parallel to each another and the refrigerant enters from one side of the fuel cell and exits from the other side. On the other hand, a group of a plurality of the refrigerant paths 1 may be arranged in parallel to each another in the single fuel cell of the stack main body 9, enters from part of one side of the fuel cell and turns back at the other side, and thus the turn-back arrangement is repeated, resulting in the series arrangement of the group of a plurality of the refrigerant paths 1, as shown in FIG. 4.

Figure 5:
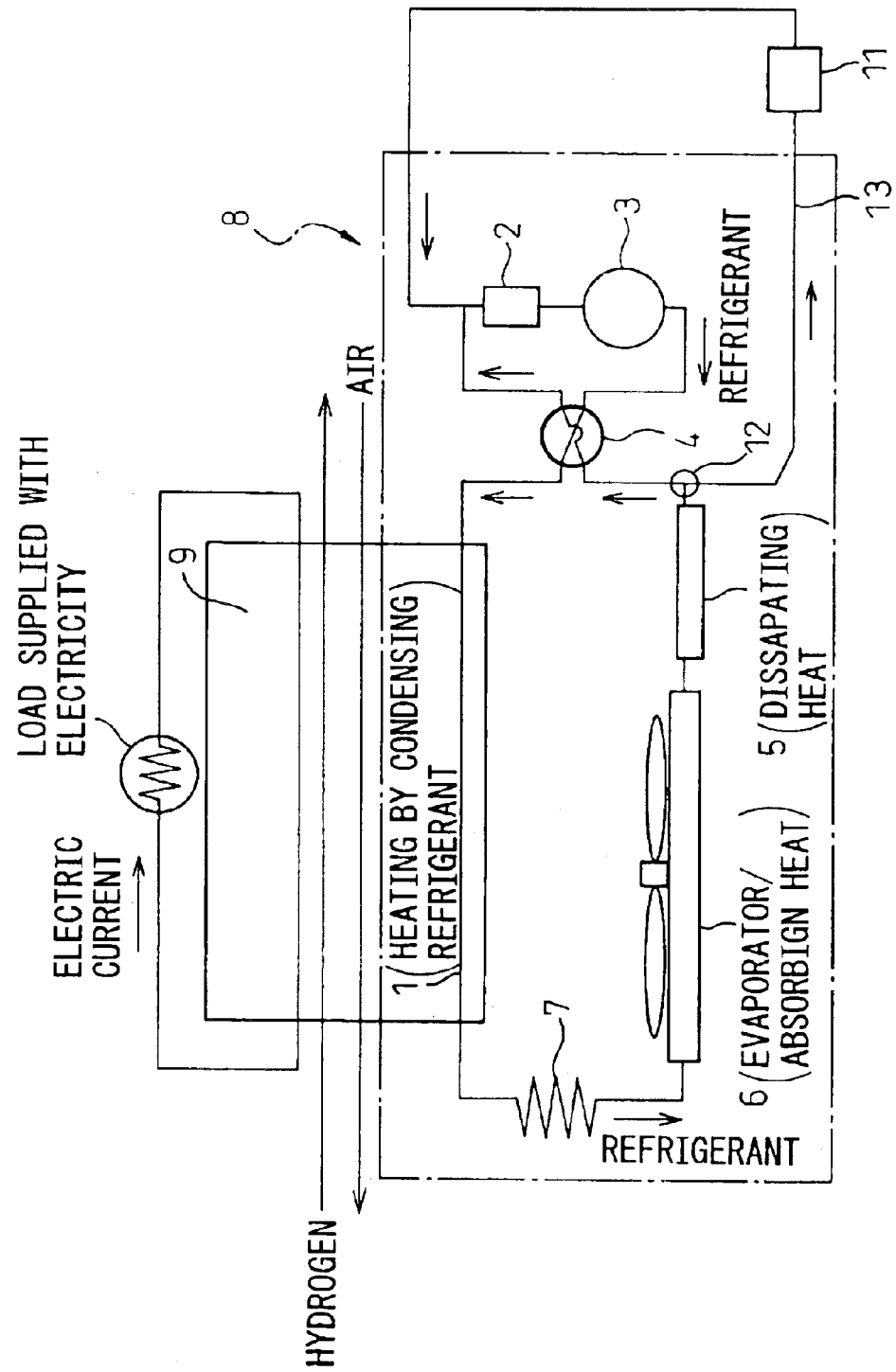
FIG. 5 shows a general configuration of a second embodiment of a cooling apparatus for a fuel cell according to the present invention, which comprises a configuration in which the heat stored in a heat storage unit 5 is supplied for warming-up to another components such as a hydrogen supplying system in a fuel cell system, and also shows the outline during the operation thereof schematically.

A second embodiment of the present invention according to the first embodiment described above, in which the heat of the heat storage unit 5 is supplied for warming-up to another components, such as a hydrogen supply system of the fuel cell system, is shown in FIG. 5. The same reference symbols are assigned to the components in FIG. 5, which are the same as or similar to those in the first embodiment disclosed in FIG. 1.

In the second embodiment in FIG. 5, in addition to the first embodiment, a branch line 13 and a branch valve 12, such as an electromagnetic valve, are provided between the heat storage unit 5 and the four-way valve 4, the refrigerant is supplied to another device 11 through the branch line 13, and the device 11, which is a component included in the fuel cell system is further warmed up, during the warming-up operation, by the use of the heat stored in the heat storage unit 5 during the normal operation. The device 11, may be, for example, at least a component of the hydrogen supply system in the fuel cell system. Therefore, the device 11 may include gas cylinder main bodies, valves, pipes, etc., for high pressure hydrogen, or gas cylinder main bodies, valves, pipes, etc., for liquid hydrogen, or a tank main body, valves, pipes, etc., for solid metal hydride, or a main body, valves, pipes, etc., for a fuel reformer, or a space within a vehicle compartment, etc. The device 11 may include equipment other than described above, and the like.

The refrigerant having warmed up the device 11 returns to the accumulator 2 and similarly circulates through the cooling circuit again.

Apart from the above-mentioned embodiment, the branch line 13 and the branch valve 12 may be provided between the four-way valve 4 and the fuel cell stack main body 9, or between the fuel cell stack main body 9 and the pressure-reducing means 7. It is possible to arrange the branch line 13 and the branch valve 12 at appropriate places in the cooling circuit if occasion arises. The operation in the present embodiment is the same as that in the first embodiment.

Figure 6:
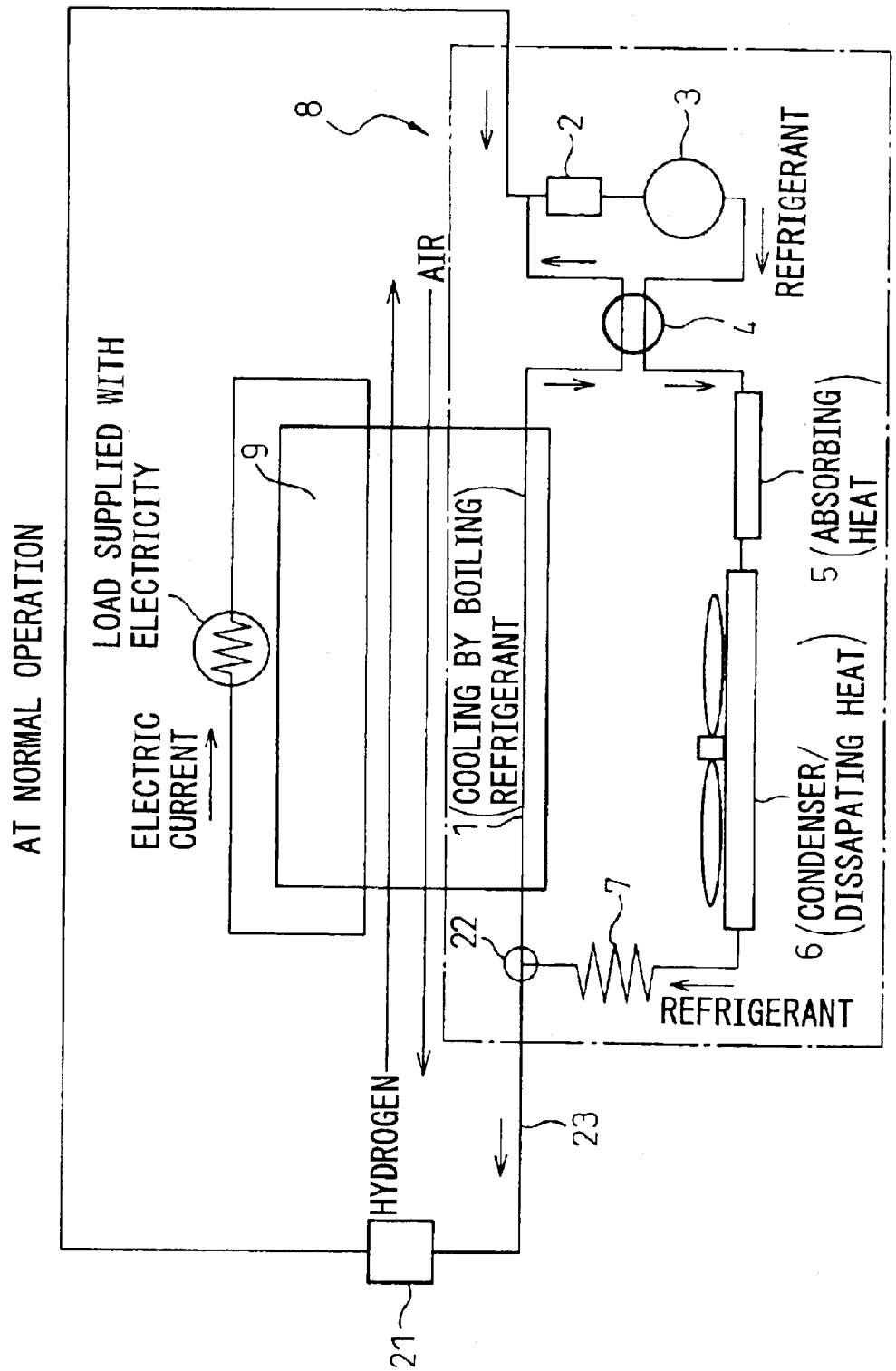
FIG. 6 shows a general configuration of a third embodiment of a cooling apparatus for a fuel cell according to the present invention, which comprises a dual system configuration, and also shows the outline during the operation schematically.

A third embodiment of the present invention according to the first embodiment is a configuration of dual system, in which the cooling apparatus 8 capable of carrying out the refrigerating cycle is also used for an air conditioning system for a vehicle compartment and the cooling apparatus 8, which is a heat pump, and the air conditioning system for a vehicle compartment are operated by the compressor 3 alone, is shown in FIG. 6. The same reference symbols are assigned to the components in FIG. 6, which are the same as or similar to those in the first embodiment disclosed in FIG. 1.

In the third embodiment in FIG. 6, in addition to the first embodiment, a branch line 23 and a branch valve 22, such as an electromagnetic valve, are provided between the pressure-reducing means 7 and the stack main body 9, the refrigerant is supplied to an air conditioning system 21 through the branch line 23 and, during the normal (cooling) operation, the fuel cell stack main body 9 is cooled and, at the same time, the refrigerant is supplied also to air conditioning system for the vehicle compartment by using the compressor 3 or the like. The present dual system can be used for the warming-up operation of a fuel cell and the warming-up operation for air conditioning.

The refrigerant having been used in the air conditioning system returns to the accumulator 2 and similarly circulates through the cooling circuit.

Apart from the above-mentioned embodiment, the branch line 23 and the branch valve 22 may be provided between the four-way valve 4 and the heat storage unit 5. Or, it is possible to arrange the branch line 23 and the branch valve 22 at appropriate places in the cooling circuit, if occasion arises.

The operation in the present embodiment is the same as that in the first embodiment.

Figure 7:
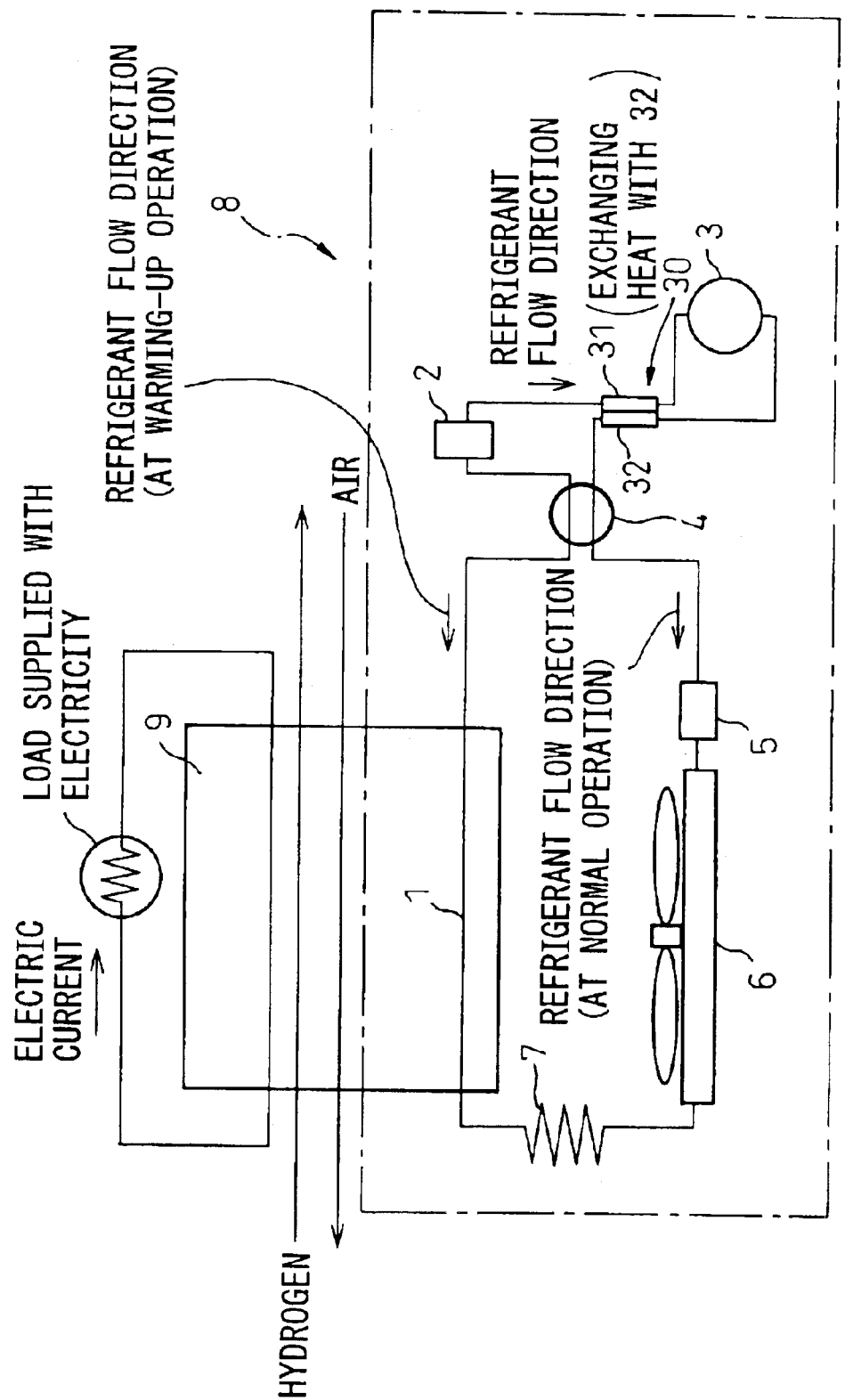
FIG. 7 shows a general configuration of a fourth embodiment of a cooling apparatus for a fuel cell according to the present invention schematically.

A fourth embodiment of the present invention according to the first embodiment, in which the cooling apparatus 8, namely a heat pump, additionally comprises a superheater 30, is shown in FIG. 7. The same reference symbols are assigned to the components in FIG. 7, which are the same as or similar to those in the first embodiment disclosed in FIG. 1.

In the fourth embodiment in FIG. 7, the superheater 30 comprising a first heat exchange unit 31 and a second heat exchange unit 32 is arranged in the heat pump cycle circuit next to the compressor 3 as shown in FIG. 7. The first heat exchange unit 31 is arranged between the suction side of the compressor 3 and the accumulator 2 and is supplied with the low temperature refrigerant on the suction side of the compressor 3. The second heat exchange unit 32 is arranged between the discharge side of the compressor 3 and the four-way valve 4 and is supplied with at least part of the high temperature refrigerant on the discharge side of the compressor 3. Heat exchange is effected between the first heat exchange unit 31 and the second heat exchange unit 32, that is, between the refrigerant, the pressure and temperature of which have already become low because of the previous heat exchange, and the refrigerant the pressure and temperature of which are high because of the compression by the compressor 3, and the low temperature refrigerant on the suction side of the compressor 3 is heated. As described above, by heating the low temperature refrigerant, on the suction side of the compressor 3, immediately after the accumulator 2 by the use of the high temperature refrigerant after the compressor 3, a rise in temperature, by about 10° C., of the refrigerant on the suction side is attained and the refrigerant on the suction side is vaporized without fail, thereby the compressor 3 is prevented from sucking the liquid refrigerant and thus the breakdown of the compressor 3 can be avoided. It may be possible to configure so that the second heat exchange unit 32 may be provided with a bypass line and the like and the flow rate of the refrigerant on the discharge side of the compressor 3 flowing through the second heat exchange unit 32 may be adjusted.

Other configuration and operation in the present embodiment are the same as those in the first embodiment.

Figure 8:
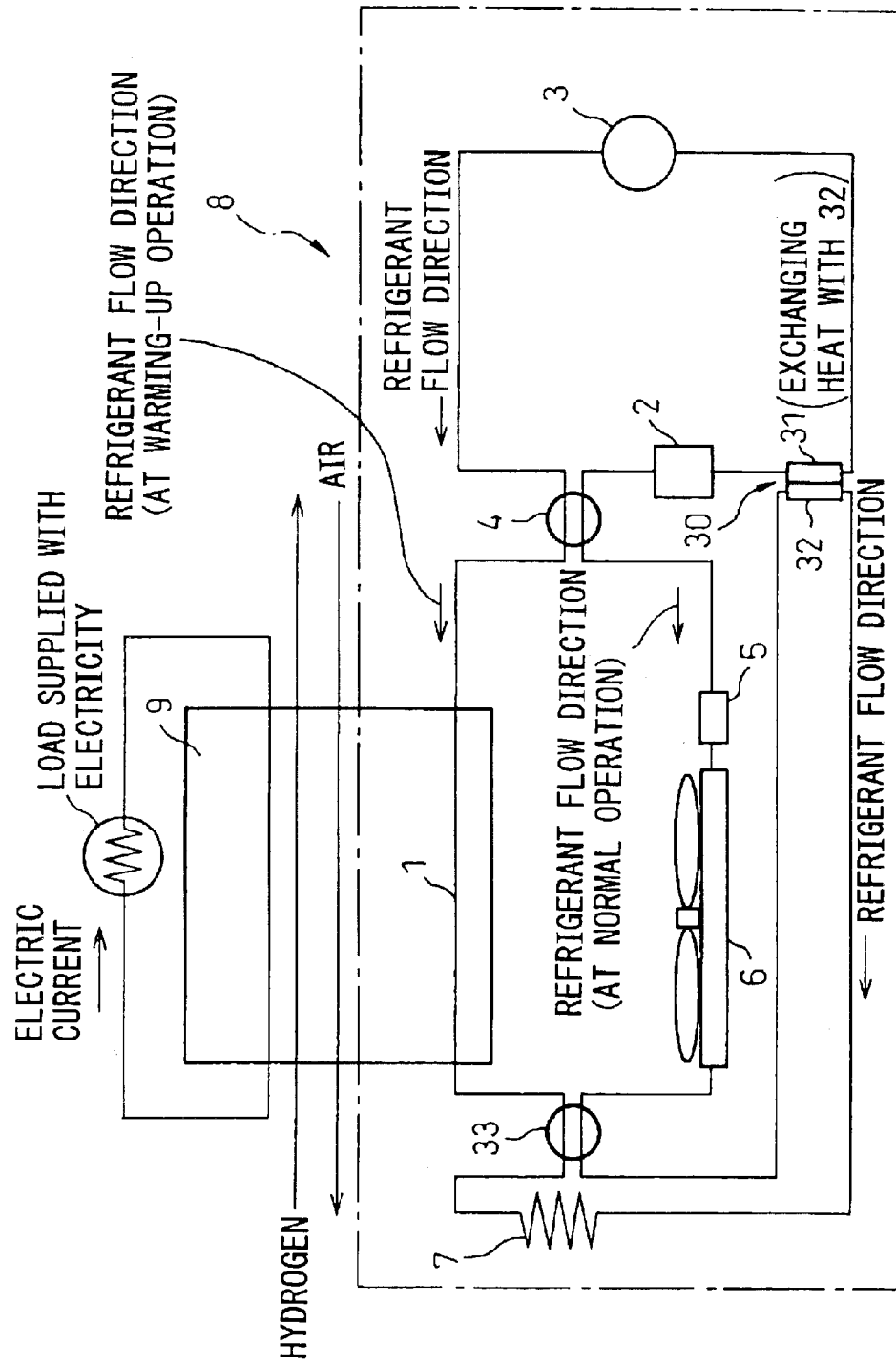
FIG. 8 shows a general configuration of a fifth embodiment of a cooling apparatus for a fuel cell according to the present invention schematically.

A fifth embodiment of the present invention according to the first embodiment, in which the cooling apparatus 8, namely a heat pump, also additionally comprises the superheater 30, is shown in FIG. 8. The same reference symbols are assigned to the components in FIG. 8, which are the same as or similar to those in the first embodiment disclosed in FIG. 1.

In the fifth embodiment in FIG. 8, the superheater 30 comprising the first heat exchange unit 31 and the second heat exchange unit 32 is arranged in the heat pump cycle circuit on the suction side of the compressor 3, as shown in FIG. 8. Further, a four-way valve for pressure-reducing means 33 is arranged in the heat pump cycle circuit next to the pressure-reducing means 7 as shown in FIG. 8, so that the direction of the high pressure and high temperature refrigerant flowing through the pressure-reducing means 7 during the normal (cooling) operation is the same as that during the warming-up operation. Therefore, the first heat exchange unit 31 is arranged between the suction side of the compressor 3 and the accumulator 2 and is supplied with the low temperature refrigerant on the suction side of the compressor 3. The second heat exchange unit 32 is arranged between the second four-way valve 33 and the pressure-reducing means 7 and is supplied with at least part of the high temperature refrigerant on the discharge side of the compressor 3 before it flows through the pressure-reducing means 7. Heat exchange is effected between the first heat exchange unit 31 and the second heat exchange unit 32, that is, between the refrigerant the pressure and temperature of which have already become low because of the previous heat exchange and the refrigerant, which has been cooled and liquefied after being compressed by the compressor 3 and the pressure and temperature of which are still high, and the low temperature refrigerant on the suction side of the compressor 3 is heated. As described above, by heating the low temperature refrigerant, on the suction side of the compressor 3, immediately after the accumulator 2 by the use of the high temperature refrigerant after the compressor 3, a rise in temperature, by about 10° C., of the refrigerant on the suction side is attained and the refrigerant on the suction side is vaporized without fail, thereby the compressor is prevented from sucking the liquid refrigerant and thus the breakdown of the compressor 3 can be avoided.

The operation relating to the present embodiment is explained below in more detail. During the warming-up operation, the high pressure and high temperature refrigerant compressed by the compressor 3 is supplied to the refrigerant path 1 of the fuel cell stack main body 9 through the four-way valve 4 and, after warming up the stack main body 9, supplied to the second heat exchange unit 32 through the four-way valve for pressure-reducing means 33, heating the refrigerant which flows through the first heat exchange unit 31, and is supplied to the pressure-reducing means 7. After this, the refrigerant passes through the four-way valve for pressure-reducing means 33, the external heat exchanger 6, the heat storage unit 5 and the four-way valve 4, in that order, and returns to the accumulator 2.

On the other hand, during the normal operation, the high pressure and high temperature refrigerant compressed by the compressor 3 is supplied to the heat storage unit 5 and the external heat exchanger 6 through the four-way valve 4 and after dissipating heat therein, is supplied to the second heat exchange unit 32 through the four-way valve for pressure-reducing means 33, heating the refrigerant which flows through the first heat exchange unit 31, and is supplied to the pressure-reducing means 7. After this, the refrigerant passes through the four-way valve for pressure-reducing means 33, the refrigerant path 1 of the fuel cell stack main body 9 and the four-way valve 4, in that order, and returns to the accumulator 2. As described above, in the present embodiment, the refrigerant at a higher pressure, a higher temperature and a high enthalpy, that is, the refrigerant on the discharge side of the compressor 3 after dissipating heat in the first (most upstream) heat exchanger and before being reduced in pressure by the pressure-reducing means 7, is supplied to the second heat exchange unit 32.

As in the fourth embodiment described above, the second heat exchange unit 32 may be provided with a bypass line and the flow rate of the refrigerant which flows through the second heat exchange unit 32 may be adjusted.

Other configuration and operation in the present embodiment are the same as those in the first embodiment.

Next, the effects and functions of the embodiments described above are explained below.

The following effects can be expected from the cooling apparatus for a fuel cell in the first embodiment of the present invention.

By using a refrigerating cycle system instead of a radiator, which has become bulky because of the necessity to provide the large cooling capacity for cooling a fuel cell, the cooling apparatus for a fuel cell can be made compact.

It is possible to quickly warm up a fuel cell, which has become cold in a stopped state, and the time required for start-up can be reduced.

By incorporating the heat storage unit into the cooling apparatus, heat can be stored therein during the normal operation, that is, during the cooling operation, and dissipated during start-up, and therefore the power consumption of secondary batteries during start-up can be reduced and the cooling apparatus can be made compact.

By adopting a heat storage unit the capacity of which is increased, the external heat exchanger can be made compact.

As it is possible to prevent the refrigerant from being frozen at a temperature of about −35° C., the fuel cell system can be started at a low atmospheric temperature of, for example, −30° C. during the warming-up operation.

By the use of a refrigerant, which boils at about 80° C. by controlling the quantity of the refrigerant contained in a cooling circuit and the refrigerant, it is possible, during the cooling operation, to make the entire fuel cell work efficiently by keeping the temperature of the membrane electrode assembly of the fuel cell at about 80° C. at which they function effectively.

In addition to the effects of the first embodiment described above, the following effect can be expected from the cooling apparatus for a fuel cell in the second embodiment of the present invention.

By providing multiple components of a fuel cell system with the waste heat of a fuel cell, it is possible to effectively use the waste heat and improve the efficiency of the entire fuel cell system.

In addition to the effects of the first embodiment described above, the following effects can be expected from the cooling apparatus for a fuel cell in the third embodiment of the present invention.

From the standpoint of an air conditioning system and the entire fuel cell system, the number of components thereof can be reduced.

By setting up the dual system configuration, the entire apparatus including the fuel cell and the air conditioner can be reduced in size.

The cost of the entire facility, such as a vehicle including the fuel cell system and the air conditioning system, can be reduced.

In addition to the effects of the first embodiment described above, the following effect can be expected from the cooling apparatus for a fuel cell in the fourth embodiment of the present invention.

The breakdown of the compressor can be avoided by vaporizing without fail the refrigerant on the suction side of the compressor and by preventing the liquid refrigerant from being compressed.

In addition to the effects of the first embodiment described above, the following effect can be expected from the cooling apparatus for a fuel cell in the fifth embodiment of the present invention.

The breakdown of the compressor can be avoided by vaporizing without fail the refrigerant on the suction side of the compressor and by preventing the liquid refrigerant from being compressed and, at the same time, the efficiency (or coefficient of performance: COP) can be increased by increasing the enthalpy difference between the inlet and the exit of the evaporation unit.

Although the present invention is applied to a fuel cell for a vehicle in the present embodiments, the present invention may be applied to a fuel cell for other than a vehicle and the field to which the present invention can be applied is not limited to the field of vehicles.

The configuration of the cooling circuit shown in the embodiments described above is only a fundamental one and various components may be included therein additionally from the standpoint of maintenance, safety, control and function thereof, and the positions or order of the constituent equipment and components may be partly changed and such modifications are clear to persons skilled in the art.

The embodiments described above are only examples of the present invention which should be defined only by claims and the present invention is not limited to the embodiments described above. Embodiments other than those described above are also possible.

What is claimed is:

1. A cooling apparatus for a fuel cell capable of not only cooling a stack main body of the fuel cell by cooling with evaporation of a refrigerant but also warming up the stack main body, comprising a cooling circuit having:

a compressor for compressing a gaseous refrigerant;

an external heat exchanger arranged on a downstream side of the compressor and for liquefying the compressed refrigerant during a cooling operation of a fuel cell system including the fuel cell;

a pressure-reducing means arranged on a downstream side of the external heat exchanger during the cooling operation; and an accumulator for storing the refrigerant having cooled the stack main body; wherein a refrigerant path of the stack main body is connected to the cooling circuit between the pressure-reducing means and the accumulator;

wherein a four-way valve is arranged so as to be connected to and to be interposed in both a first refrigerant piping between the compressor and the external heat exchanger and a second refrigerant piping between the stack main body and the accumulator, in the cooling circuit; and wherein the four-way valve then introduces the refrigerant from the compressor to the external heat exchanger during the cooling operation and to the refrigerant path of the stack main body during a warming-up operation of the fuel cell.

2. A cooling apparatus for a fuel cell, as set forth in claim 1, wherein the cooling circuit further comprises a heat storage unit.

3. A cooling apparatus for a fuel cell, as set forth in claim 2, wherein the heat storage unit is arranged between the four-way valve and the external heat exchanger.

4. A cooling apparatus for a fuel cell, as set forth in claim 1, wherein the temperature of the refrigerant within the external heat exchanger during the cooling operation is set to a high temperature of 150° C. or higher.

5. A cooling apparatus for a fuel cell, as set forth in claim 1, wherein by using any one of the refrigerants, that is, propylene, chlorodifluoromethane and propane, which do not freeze at a temperature of substantially −35° C. by selecting a combination of the operational pressure and operational temperature of the refrigerant, the fuel cell system can be started at a low atmospheric temperature of −30° C.

6. A cooling apparatus for a fuel cell, as set forth in claim 1, wherein any one of the refrigerants, such as propylene, chlorodifluoromethane and propane, which boil at a temperature of substantially 80° C. during the cooling operation by adjusting the quantity of the refrigerant contained in the cooling circuit, and the refrigerant pressure, is used.

7. A cooling apparatus for a fuel cell, as set forth in claim 2, wherein the heat stored in the heat storage unit is supplied to a portion other than the stack main body in the fuel cell system during the warming-up operation.

8. A cooling apparatus for a fuel cell, as set forth in claim 7, wherein the portion other than the stack main body includes: gas cylinder main bodies, valves and pipes for high pressure hydrogen; gas cylinder main bodies, valves and pipes for liquid hydrogen; a tank main body, valves and pipes for solid metal hydride; and a main body, valves and pipes for a fuel reformer.

9. A cooling apparatus for a fuel cell, as set forth in claim 1, wherein the cooling apparatus for a fuel cell is also used for an air conditioner and a dual system in which the cooling apparatus is used for both apparatuses is formed.

10. A cooling apparatus for a fuel cell, as set forth in claim 1, wherein the fuel cell is used in a vehicle.

11. A cooling apparatus for a fuel cell, as set forth in claim 1;

wherein the cooling circuit further comprises a superheater, that is, a heat exchanger;

wherein the superheater is arranged next to the compressor and comprises a first heat exchange unit and a second heat exchange unit;

wherein to the first heat exchange unit, the refrigerant, on a suction side of the compressor, flowing from the accumulator to the compressor is supplied and to the second heat exchange unit, at least part of the refrigerant, on a discharge side of the compressor, flowing from the compressor to the four-way valve is supplied; and wherein heat of the refrigerant is exchanged between the first heat exchange unit and the second heat exchange unit and the refrigerant on the suction side of the compressor is heated.

12. A cooling apparatus for a fuel cell, as set forth in claim 1;

wherein the cooling circuit further comprises a superheater, that is, a heat exchanger, and a four-way valve for pressure-reducing means arranged next to the pressure-reducing means;

wherein the superheater is arranged in the cooling circuit between the compressor and the accumulator and comprises a first heat exchange unit and a second heat exchange unit;

wherein two refrigerant pipes of the cooling circuit connected to a front port and a rear port of the pressure-reducing means are connected to the four-way valve for pressure-reducing means, respectively, and further a refrigerant pipe from the refrigerant path of a fuel cell stack main body and a refrigerant pipe from the external heat exchanger are connected thereto, respectively;

wherein to the first heat exchange unit, the refrigerant, on a suction side of the compressor, flowing from the accumulator to the compressor is supplied and to the second heat exchange unit, at least part of the refrigerant, from a discharge side of the compressor, flowing from the four-way valve for pressure-reducing means to the pressure-reducing means, is supplied; and wherein heat of the refrigerant is exchanged between the first heat exchange unit and the second heat exchange unit and thus the refrigerant on the suction side of the compressor is heated.

13. A cooling apparatus for a fuel cell, as set forth in claim 1, wherein the cooling apparatus directly cools the stack main body by cooling with evaporation of the refrigerant.

* * * * *